United States Patent
Yeh et al.

(10) Patent No.: US 8,082,288 B1
(45) Date of Patent: Dec. 20, 2011

(54) METHOD AND APPARATUS FOR DETERMINING NOTABLE CONTENT ON WEB SITES USING COLLECTED COMMENTS

(75) Inventors: Kenneth Yeh, El Monte, CA (US); Gladys Kong, Pasadena, CA (US)

(73) Assignee: GO Interactive, Inc., Pasadena, CA (US)

( * ) Notice: Subject to any disclaimer, the term of this patent is extended or adjusted under 35 U.S.C. 154(b) by 13 days.

(21) Appl. No.: 12/580,156

(22) Filed: Oct. 15, 2009

Related U.S. Application Data

(60) Provisional application No. 61/106,481, filed on Oct. 17, 2008.

(51) Int. Cl.
*G06F 15/16* (2006.01)
*G06F 17/30* (2006.01)

(52) U.S. Cl. .................................. 709/200; 707/723

(58) Field of Classification Search .......... 709/204–207, 709/217–219; 707/723–732, 748–755; 704/9; 705/7.32; 706/45–50
See application file for complete search history.

(56) References Cited

U.S. PATENT DOCUMENTS

| | | | |
|---|---|---|---|
| 7,421,429 B2 | 9/2008 | Thota | |
| 2007/0038646 A1* | 2/2007 | Thota | 707/100 |
| 2007/0061297 A1* | 3/2007 | Bihun et al. | 707/3 |
| 2007/0073667 A1 | 3/2007 | Chung | |
| 2007/0198459 A1* | 8/2007 | Boone et al. | 707/1 |
| 2007/0214097 A1 | 9/2007 | Parsons et al. | |
| 2007/0288416 A1* | 12/2007 | Ferguson et al. | 706/50 |
| 2008/0091797 A1* | 4/2008 | Busey | 709/217 |
| 2008/0201222 A1* | 8/2008 | Lahaix | 705/14 |
| 2008/0235204 A1* | 9/2008 | Dai et al. | 707/5 |
| 2008/0249764 A1* | 10/2008 | Huang et al. | 704/9 |
| 2009/0037470 A1* | 2/2009 | Schmidt | 707/104.1 |
| 2009/0164408 A1 | 6/2009 | Grigorik et al. | |
| 2009/0216524 A1* | 8/2009 | Skubacz et al. | 704/9 |
| 2009/0228428 A1* | 9/2009 | Dan et al. | 707/1 |
| 2009/0265332 A1* | 10/2009 | Mushtaq et al. | 707/5 |
| 2010/0042618 A1* | 2/2010 | Rinearson et al. | 707/5 |
| 2010/0121857 A1* | 5/2010 | Elmore et al. | 707/748 |
| 2011/0082849 A1 | 4/2011 | Rakowski et al. | |

OTHER PUBLICATIONS blogpulse™, About >FAQs, Oct. 27, 2005, Internet article: http://www.blogpulse.com/about.html, (11 pages).
"About Technorati", Currently Tracking 20.2 Million Sites and 1.6 Billion Links, Technorati™, Oct. 27, 2005, Internet article: http://www.technorati.com/about/, (2 pages).
Fujimura, Ko, et al., "The EigenRumor Algorithm for Ranking Blogs", May 2005, Chiba, Japan, (6 pages).
Non-Final Office Action (dated Apr. 28, 2011), U.S. Appl. No. 12/580,147, Date Filed—Oct. 15, 2009, First Named Inventor: Kenneth Yeh, 11 pages.
Notice of Allowance and Fee(s) Due, (dated Aug. 4, 2011), U.S. Appl. No. 12/580,147, Date Filed—Oct. 15, 2009, First Named Inventor: Kenneth Yeh, 6 pages.

\* cited by examiner

*Primary Examiner* — Brendan Higa
(74) *Attorney, Agent, or Firm* — Blakely, Sokoloff, Taylor & Zafman, LLP

(57) ABSTRACT

A computerized method for gauging the importance of web content and presenting selected content to a user is described. Comments that have been posted by a user to a first comment-enabled entry in a web site are collected. The collected comments of the user are analyzed to gauge sentiment of the user towards the first entry and on that basis it is decided whether or not to include the first entry as part of notable web content. The notable web content is then presented to a user. Other embodiments are also described and claimed.

23 Claims, 3 Drawing Sheets

METHOD AND APPARATUS FOR DETERMINING NOTABLE CONTENT ON WEB SITES USING COLLECTED COMMENTS

This application claims the benefit of the earlier filing date of U.S. provisional application No. 61/106,481, filed Oct. 17, 2008.

BACKGROUND

On the Internet, weblogs (i.e., "blogs") are hosted on web sites and contain content such as articles of information, usually in a non-commercial aspect, that are posted by authors. For example, blogs may contain a commentary or a description written by an author on a particular topic or matter that may include text, images and video. Collectively, a community of weblogs may be called a "blogosphere." A significant feature of blogs includes the ability for users to respond to blog posts by submitting user feedback on a web site. User feedback is typically in the form of submitted comments from users that are then included on the intended web page or blog post.

In an autonomous network environment such as the Internet, identifying and ranking notable or important content on web sites and blogs may be accomplished using various web search and ranking algorithms. As blogs have proliferated on the Internet, the tasks of navigating, identifying and organizing blog content have also been implemented using available web search and ranking techniques. For example, an existing technique to identify and rank content on a web site relies on tracking a number of instances that the web content is linked to by other web pages. By tallying the number of web pages that link to the web content, the ranking of the web content can be determined in comparison with other web content.

However, in existing techniques, user feedback (i.e., in the form of comment data) posted on a web site or blog is not considered in ranking the web content. Therefore, an analysis of the comment data is not performed in ranking web pages.

SUMMARY

In accordance with an embodiment of the invention, a process and apparatus are described for scanning users' comments on a web site and analyzing the scanned results, to select notable content on the web site, based on the users' comments. In accordance with an embodiment of the invention, a computerized method for gauging the importance of web content and presenting selected content to a user is as follows. Comments that have been posted by a user to a first comment-enabled entry in a web site are collected. The web site may include many comment-enabled entries. The collected comments of the user are then analyzed, to gauge or measure the user's sentiment towards the subject matter of the first entry. On that basis, it is then decided whether or not to include the first entry as part of notable web content (which is to be then presented to a web user). An importance score may be computed, for a given entry, based on the gauged user sentiments. A list of some of the entries in a web site, ranked according to their determined importance scores, may be presented to a web user. The latter may be done by displaying the ranked list on an opening page of the web site (e.g., a blog that the web user is interested in). Alternatively, the ranked list may be displayed in response to a search request entered by the web user in a web search portal.

The gauged sentiment of a user may be determined as being positive or negative. The gauged sentiment may be positive when the user uses words like "great", "awesome", "terrific" and "wonderful" in his comments. This may be detected by parsing that user's comments (that he has posted for the particular entry), searching for multiple instances of any one or more those terms, and/or their synonyms.

On the other hand, the sentiment may be determined as being negative when the user uses words like "bad", "stupid", "dumb", and "idiot" in his comments. This may be detected by parsing the user's comments to find multiple instances of any one or more of those terms (and/or their synonyms).

An intensity of the sentiment (towards the subject matter of the entry) may also be gauged. In one instance, the gauged intensity may be high if the user has posted a large number of comments to the entry, low if he has only posted a small number. Whether the gauged intensity is high or low can be determined in relation to 1) an average number of comments that have been posted to the entry by several users, 2) an average number of comments that have been posted by several users to several entries in the web site, or 3) an average number of comments that have been posted by the same user to several entries in the web site. If the gauged intensity is high, then this would be a factor in favor of including the entry within a "notable web content" data structure. That may be because repeat posts imply that the user cares deeply about the content of the entry. On the other hand, a low intensity sentiment would indicate the reverse, and would be a factor in favor of excluding the entry.

In another embodiment of the invention, the gauged positive or negative sentiment by each of several users towards a particular comment enabled entry (or towards several entries that are on the same topic), are computed. A poll data structure on the entry is then updated based on the gauged positive and/or negative sentiments of the users. Variables in the poll data structure that may be updated include those that indicate the total number of users that have posted comments to the entry, how many of those have positive sentiments, how many have negative sentiments, and how many have unknown sentiments (perhaps because a clear or definite sentiment could not be computed for those users). Information computed from the poll data structure may then be presented to a web user, e.g. what percentage of the total number of users have a positive sentiment, and what percentage have a negative sentiment.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

Embodiments of an apparatus and process for selecting web content, using a calculated measure of the sentiments of readers ("users") who have posted comments as feedback in response to the content, are described. In particular, an advantage over prior solutions for ranking web content is that it is the users who are familiar with a web site that in effect determine which content on that web site is important enough to be presented to other web users.

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, functional, and other changes may be made without departing from the scope of the present invention. The following detailed description is, therefore, not to be taken in a limiting sense, and the scope of the present invention is defined only by the appended claims. It will be apparent to one of ordinary skill in the art that the embodiments may be practiced without some of these specific details. In other instances, certain structures and devices are omitted or simplified to avoid obscuring the details of the various embodiments. As used herein, a 'set' refers to any whole number of items including one item.

Figure 1:
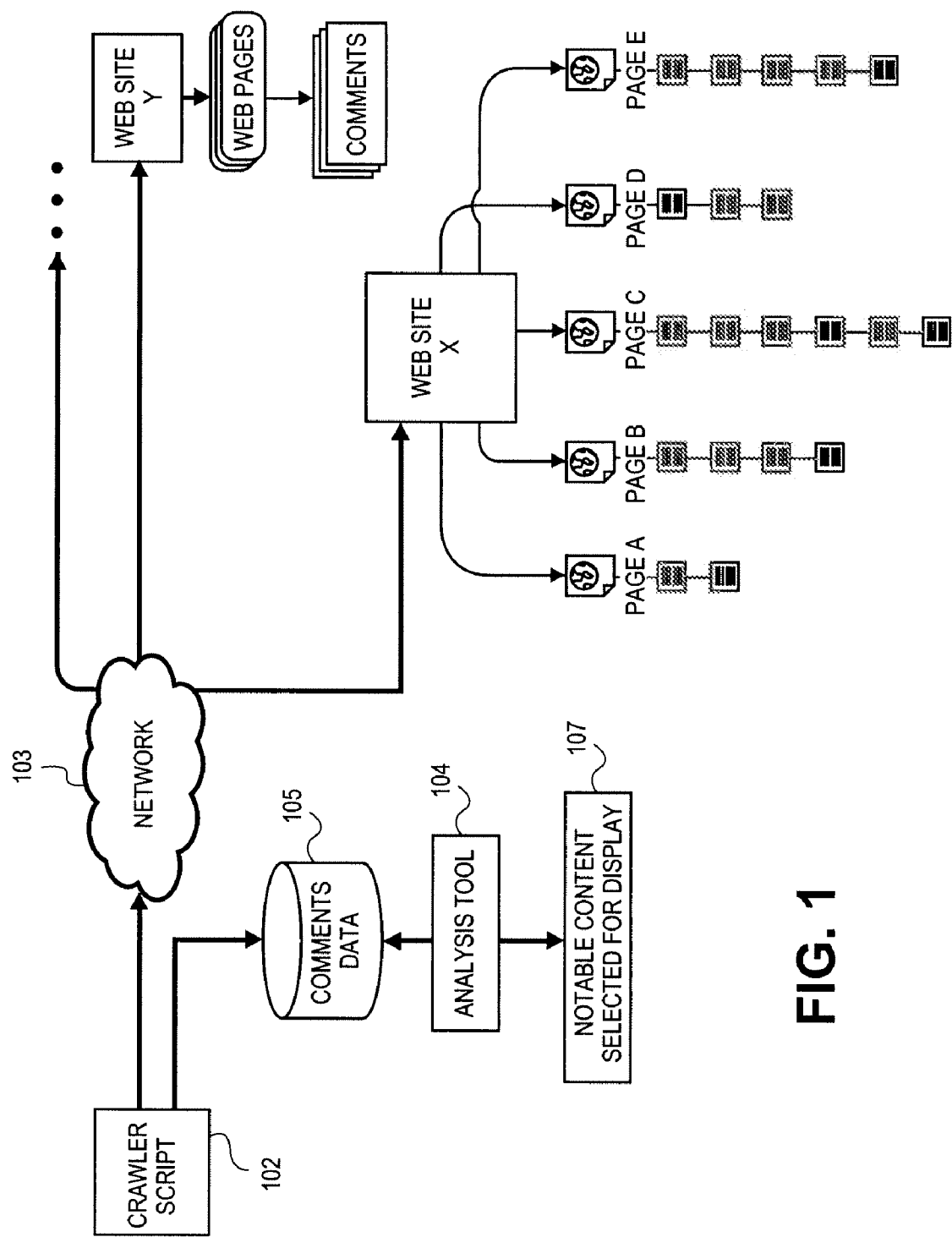
FIG. 1 is a diagram of one embodiment of an apparatus for scanning user feedback and then analyzing the scanned user feedback to determine notable content on a web site.

As shown in FIG. 1, an embodiment of the invention includes the following components:

(1) a comment crawler script 102 that determines comment counts and comment text from articles (i.e., web pages or blog posts), by scanning user feedback given to a web site; and (2) tool 104 to analyze the comment counts and comment text in order to select notable content. Other components include storage (comment database 105) for storing the collected comment data, and a presentation tool, not shown. An example of the latter is a web server application that makes the selected notable content (e.g., ranked content) available over a network to the web site or to another web site (e.g., a web search portal), for subsequent display on a web browser application of a web user.

Scanning User Feedback

FIG. 1 illustrates one embodiment of an apparatus including a computerized system for scanning a web site to extract user feedback as comments data and then analyze the comments data. Each of the elements in FIG. 1 may comprise hardware (e.g., circuitry, dedicated logic, disk storage, memory, etc.), software (e.g., when executing on a general purpose computer system, dedicated machine, or a distributed system), or a combination of both (e.g., programmed data processing components, or generically "programmed processor" or "programmed computer system") that communicate with one another using well known networking and data communication protocols.

In one embodiment, a crawler script 102 connects to web sites X and Y over a network 103 (e.g., a LAN, WAN or the Internet) and browses web pages on web sites X and Y. The crawler script 102 or data collector may be software that programs a client or a server computer to perform the data collection operations described here. Although two web sites are shown in FIG. 1, it should be understood that one of ordinary skill in the art could implement the crawler script 102 to browse and retrieve data from more than two web sites without departing from the scope of the invention described herein. The crawler script 102 scans posted user feedback by browsing or monitoring (over time) comment-enabled entries in the web sites in a programmatic manner. The comment-enabled entries may be web pages that provide commentary or news on various subjects. User feedback may be in the form of textual comment data (or comments) from visitors to the web sites, which comments are then said to be included on the web pages in the web sites. The user feedback may alternatively be included on a web site forum or message board hosted by the web site.

Web sites X and Y may include blogs each with its own blog posts or web pages containing comment data. The blogs on the web sites may be implemented using a particular software package such as blog software or be provided by a blog publishing/hosting service. In one embodiment, a blog post is a web page with structured feedback that allows users (viewers or visitors to the blog post) to post comments in response to the blog post. A blog post may contain an article of information submitted (uploaded) by its author and may include text, images, and/or video data. A blog post may conform to a standardized markup language (e.g., HTML or XML) that describes the appearance, structure, content, and/or semantics of the blog post, by using a set of standardized tags.

As shown in FIG. 1, the crawler script 102 may scan the web pages of Web Site X and then analyze the comments data for those web pages. For example, web site X here includes web pages A-E each with its respective set of comments. The crawler script 102 may determine that web page A has 2 comments, web page B has 4 comments, web page C has 6 comments, web page D has 3 comments, and web page E has 5 comments. The crawler script 102 may analyze each blog post or web page to determine the total number of comments that the blog post has received from users, as well as how the comments are distributed amongst users, i.e. identify those comments that were posted by a given user.

In one embodiment, comment data may be identified based on standardized markup language tags. In another embodiment, the crawler script 102 determines the total number of comments, and the identity of the users who posted them, based on known markup language conventions used across many sites on the network (e.g., Internet) or known from using similar software. Moreover, the crawler script 102 may also rely upon custom profiles designed to obtain the comments per blog post from specific sites. The crawler script 102 may also determine the total number of comments per blog post and their user distribution by examining the language (e.g., text data) on the web page and the placement and position of the language. The crawler script 102 may obtain this information using on any of the aforementioned techniques alone or in combination with one another.

The blogs on web sites X and Y may include Really Simple Syndication ("RSS") feeds. RSS feeds allow web sites to syndicate content to subscribers automatically. An RSS feed may include metadata in a standardized markup language format such as XML, which includes full or excerpted text from blog posts and other data (e.g., publishing dates, authorship, links, descriptions). For example, RSS feeds on web sites X and Y may distribute data related to blog posts on web sites X and Y to users or subscribers. An RSS feed may also include a list of items related to blog posts that are presented in chronological order based on posting dates or times. In one embodiment, the crawler script 102 may retrieve data from an RSS feed on a web site such as web site X shown in FIG. 1. The crawler script may then parse the RSS feed to extract data related to comments included on blog posts. The crawler script may extract comment data by recognizing standardized markup tags in the RSS feed. Based on the extracted data from the RSS feed, the crawler script 102 may determine the number of comments posted per blog post or web page. As an alternative or in addition to RSS, the crawler script 102 may be designed to use other mechanisms for crawling and processing web content for comments.

As further shown in FIG. 1, the crawler script 102 may store the data related to comments per blog post and per web site, in a comments database 105. The crawler script may retrieve the data from web pages and web sites over the network according to a predetermined schedule or frequency to update or "refresh" the data in the comments database 105, thereby, for example, tracking the number of comments that are posted to an entry on the web site, which allows the ranking of the entries in the web site to be repeatedly updated over time (based on a calculated moving average described further below).

In one embodiment, the comments database 105 comprises a random access memory (RAM) or other dynamic storage device, together with associated file system or database software that programs a computer to manage the storage data structures. The comments database 105 may also comprise a non-volatile memory device (FLASH RAM). In another embodiment, the comments database comprises a non-volatile storage device such as a magnetic disk (i.e., hard drive) or a solid-state drive (SSD).

Selecting Notable Content Based on the Comment Data

FIG. 1 illustrates an analysis tool 104 that retrieves comments data stored in the comments database 105 and analyzes it to determine notable content 107 (selected for subsequent display to a web user). In one embodiment, the analysis tool 104 is implemented by processing logic that may comprise hardware (e.g., circuitry, dedicated logic, etc.), software (e.g., executed on a general purpose computer system, a dedicated machine, or a distributed system), or a combination of both.

The analysis tool 104 may determine a ranking of content from a web site or blog, based on the comments data. Based on this ranking, the analysis tool 104 may then select notable or important content 107, as the web pages or blog posts of the web site, to be presented to a web user. The analysis tool 104 accesses those comments that have been posted by a user, to a particular comment-enabled entry in a web site, from the comments database 105. Information used by the analysis tool 104 may include the posted comments, as well as the comment-enabled entry itself, the total number of user feedback comments posted for the entry, the relevance of each comment, as well as a measure of the quality of each comment. For instance if a comment is deemed to be irrelevant, it may be excluded from taking part in the decision to select the notable content 107, which is described below. Similarly, a comment that is deemed to be of extremely low quality could also be excluded or deemphasized from the subsequent analysis. The quality and relevance of each comment may be determined entirely using automated word count and keyword density analysis of the main text of the comment. The determination as to whether a comment is of high quality or high relevance may alternatively be a manual one, that is, performed by a human user.

The selected notable content 107 may include entries from different web sites but that have been organized into the same category. Using editorial categorization data, the analysis tool 104 may pick the top web pages or blog posts (e.g., articles) from different blogs within the same specific category. For example, blogs may be organized into categories such as entertainment, sports, lifestyle, or hobbies. These categories are not to be considered in a limiting sense and one of ordinary skill in the art may include more or less categories. The comment data in the comments database 105 may also be organized by a selected category. A web user may request to view the blogs for a specific category, and the analysis tool 104 in response may then select the notable content 107 based on the comments data specific to web sites or blogs belonging to just the selected category. In this manner, notable content 107 may be determined based on the editorial categorization data.

The selected notable content 107 may then be presented to a web user. For example, the selected notable content for a web site may be presented as a list of hyperlinks to the selected, notable web pages of the web site. This may be done on the opening page (welcome or home page) of that same web site (e.g., a blog). The user may be presented with the selected notable content along with excerpts or descriptions of the corresponding web pages (e.g., blog posts). The notable content 107 that is presented to the user may include those entries that have higher importance scores (i.e., more notable) than those that are not presented. In this fashion, the analysis tool 104 may decide to present some web content and not other web content from the same web site. In one embodiment, the displayed links corresponding to the notable content are ordered vertically on the opening page of the web site, in accordance with determined importance scores (e.g., ascending or descending order).

Gauging a User's Sentiment

Figure 2:
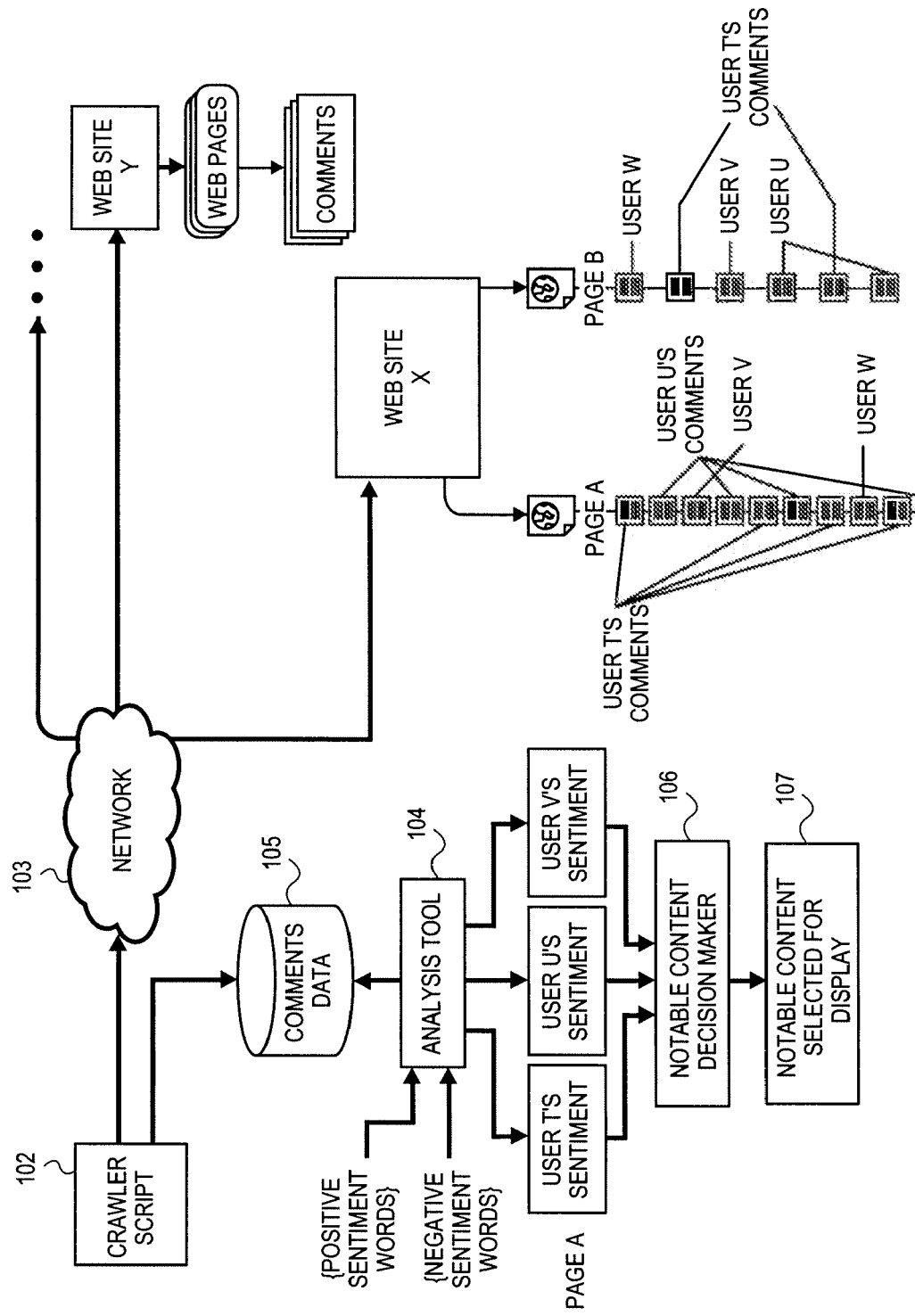
FIG. 2 is a more detailed diagram of one embodiment of the apparatus for determining notable content in a web site.

Turning now to FIG. 2, a more detailed block diagram of an embodiment of the invention is shown, to illustrate the concept of how to gauge a user's sentiment and use the gauged sentiment in selecting the notable content 107. This figure shows an example where web site X has several web pages A, B, . . . . Each page is an example of a comment-enabled entry. Page A has ten posted comments, while page B has seven posted comments by five users. This information is collected and stored in the comments database 105 and is available to the analysis tool 104. The analysis tool 104 can access that stored information and compute that user T and user U have each posted four comments to page A. In addition, each of users W and V has posted a single comment to page A. This information is then used to gauge the sentiment of each user, towards page A. A gauged sentiment may be determined as being positive or negative. For example, if the user uses words like "great", "awesome", "terrific", and "wonderful" in his comments, it could be inferred that this user has a positive sentiment towards the subject matter of the entry. To detect this, the analysis tool 104 automatically parses that user's comments, searching for multiple instances of any one or more of those positive sentiment words (which includes also their synonyms).

On the other hand, a gauged sentiment may be determined as being negative when the user uses words like "bad", "stupid", "dumb", and "idiot" in his comments. Again, this may be automatically detected by parsing the user's comments to find multiple instances of any one or more of those negative sentiment words (including any synonyms). The analysis tool 104 may in this manner compute a sentiment for each user that has posted comments to a given entry. Note that in some cases, none of a given user's comments might include positive sentiment words or negative sentiment words. In that case, the user's sentiment might be deemed neutral, that is neither positive nor negative.

The computed users' sentiments are then made available to a notable content decision maker 106. This computerized component is responsible for determining whether a given comment-enabled entry (e.g., page A) should or should not be made part of notable content 107, which is selected to be displayed to a web user. For instance, if a given web page has a large number of positive sentiment and/or negative sentiment users (computed based on the comment data posted to that web page), then the web page may be deemed notable. On the other hand, if the analysis tool 104 computed very few (or none) positive or negative sentiments, then the decision maker 106 could infer in effect that the given web page is not of sufficient interest to its readers and thus excludes it from the notable content 107.

Another factor that may be used by the decision maker 106 to select the notable content 107 is the gauged intensity of a user's sentiment (towards the subject matter of a particular entry). In one instance, the gauged intensity may be high if the user has posted a large number of comments to the entry, low if he has only posted a small number. To put this in perspective, a positive sentiment (as introduced above) means that the user feels "good" about an article. In contrast, a high sentiment means the user is particularly passionate about the article, and may feel either very good/happy or very bad/angry about the article.

Whether the gauged intensity is high or low can be determined in relation to, for example, 1) an average number of comments that have been posted to the entry by several users, 2) an average number of comments that have been posted by several users to several entries in the web site, or 3) an average number of comments that have been posted by the same user to several entries in the web site. Thus, taking the comment distribution in FIG. 2 as an example, the average number of comments posted to page A per user may be an arithmetic mean computed as follows $$\{4_T+4_U+1_V+1_W\}/4=2.5$$

where the average number of comments that have been posted to page A (per user) is 2.5. Users T and U are above this average, whereas users V and W are below it. Accordingly, the gauged intensity of users T and U are high, whereas the gauged intensity of users W and V are low. Other ways of defining high and low intensities of user sentiment are possible. When the gauged intensity of one or more users are found to be high, then this would be a factor in favor of including the entry within the notable content 107. That may be because repeat posts imply that the users (in this example, users T and U) care deeply about the content of page A. On the other hand, a low intensity sentiment by at least a majority of the users that have posted would indicate the reverse, i.e. a factor in favor of excluding the page A from the notable content 107.

The average number of comments per page may be a running average. A running average takes a set of data and creates an average of one subset of the full data set at a time. For example, the analysis tool 104 may determine the running average within a defined time period (e.g., 1 hour, 1 day, 1 week, 1 month, etc.) and repeatedly and periodically calculate the average number of posts per page within that defined time period, as time goes on. The analysis tool 104 may alternatively calculate a running average based on a set number of articles or blog posts. For example, the average number of comments per page may be determined from the past 300 posted articles or pages on a blog, and this calculation can be repeated on the newest 300 articles, as time goes on.

It should be noted that while FIG. 2 gives the example of a single web site X and how the analysis tool 104 determines user sentiments in relationship to a given web page of web site X, this concept can be extended to more than one web page of the web site, and more than one web site. For example, the subject matter of page B may be closely related to the subject matter of page A (e.g., both discuss the Obama administrations' health care plan proposals). In that case, computing user T's sentiment towards page A would also encompass counting two additional comments posted by user T against page B. Similarly, user V would be deemed to have two comments (one against page A and another against page B), user U would be deemed to have six comments, and user W would be deemed to have two comments.

In another embodiment, the gauged positive or negative sentiments of the users towards a particular comment-enabled entry (or towards several entries that discuss a common or related topic) are used to update a poll data structure that represents or informs the results of a poll on the subject matter of the entry. Variables in the poll data structure to be updated may include 1) an indication of the total number of users that have posted comments to the entry, 2) how many of those have positive sentiments, 3) how many have negative sentiments, and 4) how many have unknown sentiments (perhaps because a clear or definite sentiment could not be computed in those instances). One or more web pages of a web site may be monitored over a given time interval or until a target number of comments have been posted, and the gauged positive and negative sentiments of the users posting those comments are computed and routinely updated in the poll data structure. At any time during the poll interval or at the end of the interval, a final report on the poll data structure can be produced that includes information computed from the poll data structure. The report may then be presented to a web user. This report may include, for example, a percentage of the total number of users (that have posted comments) who exhibited positive gauged sentiment towards the subject matter of the entry, and what percentage exhibited negative gauged sentiment. Such poll results may be presented in a variety of different ways, e.g. on the same web site that was being monitored, or on a separate news or web portal web site.

Incorporating With Results of a Search Request

Figure 3:
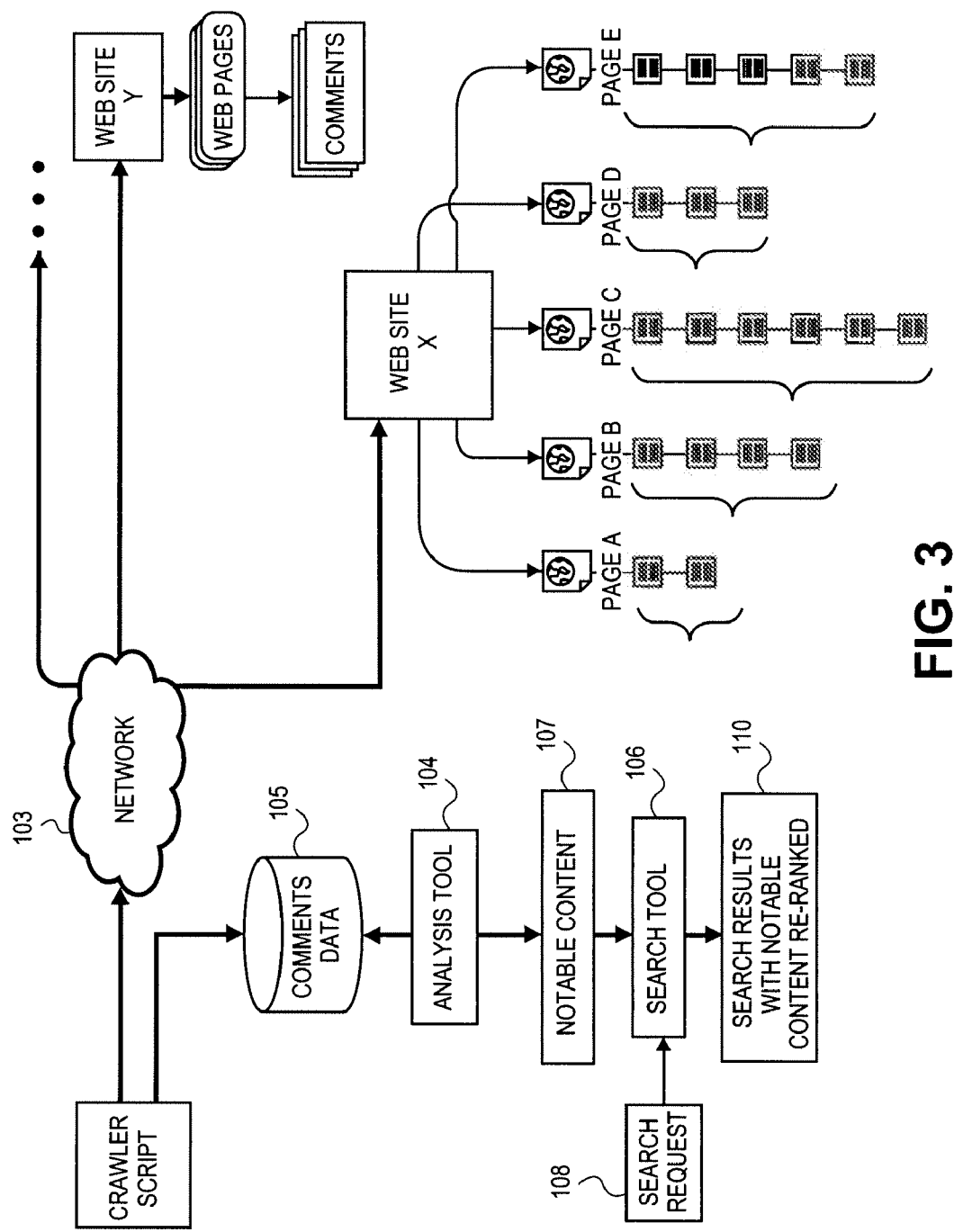
FIG. 3 is a diagram of one embodiment of an apparatus for incorporating notable content from web sites into search results.

FIG. 3 illustrates another embodiment of the invention, where notable content of web sites is incorporated into search results. Each of the elements in FIG. 3 may comprise hardware (e.g., circuitry, dedicated logic, disk storage, memory, etc.), software (e.g., when executing on a general purpose computer system, dedicated machine, or a distributed system), or a combination of both.

As in the embodiment of FIG. 1, the crawler script 104 here may monitor a web site (e.g., blog) that has comment-enabled entries or pages, by tracking the comments that are posted to entries (i.e., blog posts or web pages) of the web site by visitors or users to the web site. A comment-enabled web page or entry is a web page that includes an interactive feature for users to submit user feedback or comments in response to having viewed or otherwise experienced the web page or blog post. For example, the comment-enabled entry may provide commentary or news on a particular subject and, in response, users may submit feedback and comments. In one embodiment, the crawler script 104 stores data related to the comments that are posted to each of the entries of the web site, in the comments database 105.

Based on any one of the techniques described above, the analysis tool 104 can determine the relative popularity of pages in a particular web site, at a given moment in time. The relative popularity of each page may be quantified. The analysis tool 104 may then determine a ranking of the blog posts/ web pages in a web site based on the relative popularity of the blog posts. For example, in FIG. 3, the respective pages on web site X may be ranked in descending order from most notable to least, as pages C, E, and B, based on analysis of their comments. The analysis tool 104 may then output a ranked listing of the web pages or blog posts for web site X, based on this analysis. Further, as discussed previously, the analysis tool may also use other factors (described previously in connection with FIG. 1) to determine, rank, and select the notable content 107. These other factors may include the computed or manually indicated quality and/or relevance of each of the comments posted to a given blog. The analysis tool 104 may use all of these techniques as input to in effect inform or make the final decision about the importance score to be assigned to the given blog.

The selected notable content 107 provided by the analysis tool 104 may be incorporated with the results of a web search request 108. As shown in FIG. 3, a search tool 106 may receive the search request 108. In one embodiment, the search tool 106 may be included on a web portal or similar web site (e.g., that of a Web search service). The search tool 106 may execute the search request 108 to obtain search results. The search results may then be incorporated with the selected notable content from the analysis tool 104, into a combination 110 of, for instance, search results and re-ranked notable content. In one embodiment, the notable content 107 is re-ranked according to the results of the search request and then presented to the requesting user on a web site. In another embodiment, the notable content 107 is simply highlighted, not re-ranked, within the search results. The notable content 107 may be presented as a list of links that are re-ordered according to the search results. Alternatively, the search results may include a list of hits to web pages that are also in the notable content 107; the search results' list of hits is then re-ranked according to their importance scores as reflected in the notable content 107.

To conclude, various aspects of a technique for determining notable content on a web site and displaying a ranking to a browsing user based on it, have been described. As explained above, an embodiment of the invention may be a machine-readable medium (e.g., Compact Disc Read-Only Memory, server computer storage) having stored thereon instructions which program a processor or computer system to perform some of the operations described above. In other embodiments, some of these operations might be performed by specific hardware components that contain hardwired logic. Those operations might alternatively be performed by any combination of programmed data processing components and fixed hardware circuit components.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

What is claimed is:

1. A computerized method for gauging the importance of web content and presenting selected content to a user, comprising:

collecting a plurality of first comments that have been posted by a user to a first comment-enabled entry in a web site, wherein the web site includes a plurality of comment-enabled entries;

computing a running average number of comments per user per entry within a defined time period;

analyzing the collected first comments of the user to gauge sentiment of the user towards the first entry, including comparing the running average to the total number of collected first comments that have been posted by the user to the first comment-enabled entry;

based on the gauged sentiment, deciding whether or not to include the first entry as part of notable web content; and presenting said notable web content to a user.

2. The method of claim 1 wherein the gauged sentiment is one of positive and negative.

3. The method of claim 2 wherein the analyzing comprises:

parsing the collected first comments to find out how often one or more words of positive sentiment appear; and parsing the collected first comments to find out how often one or more words of negative sentiment appear.

4. The method of claim 1 wherein the gauged sentiment towards the first entry has high intensity, the method further comprising:

collecting a plurality of second comments that have been posted by the user to a second comment-enabled entry, analyzing the collected second comments to gauge sentiment towards the second entry, wherein the gauged sentiment towards the second entry has low intensity.

5. The method of claim 4 wherein the gauged sentiment towards the first entry has high intensity because one of a) words of positive sentiment and b) words of negative sentiment, appear often, and the gauged sentiment towards the second entry has low intensity because one of a) words of positive sentiment and b) words of negative sentiment, appear seldom.

6. The method of claim 1 wherein the gauged sentiment towards the first entry has low intensity, the method further comprising:

collecting a plurality of second comments that have been posted by the user to a second comment-enabled entry, analyzing the collected second comments to gauge sentiment towards the second entry, wherein the gauged sentiment towards the second entry has high intensity.

7. A computerized method for gauging the importance of web content and presenting selected content to a user, comprising:

counting comments that have been posted by a plurality of users to a plurality of comment-enabled entries in a web site;

computing an average number of comments per user per entry, for said plurality of comment enabled entries;

comparing the number of comments posted by one of the users to one of the comment-enabled entries, and the average number of comments per user per entry, to gauge sentiment of said one user towards said one entry;

based on the gauged sentiment, deciding whether or not to include said one entry as part of notable web content; and presenting said notable web content to a user.

8. The method of claim 7 wherein the gauged sentiment is one of positive and negative.

9. The method of claim 8, further comprising:

creating a data structure for each of the comment-enabled entries that includes a count of a total number of users that have posted comments to the comment-enabled entry, a count of the total number of users that have a positive sentiment to the comment-enabled entry, a count of the total number of users that have a negative sentiment to the comment-enabled entry, and a count of the total number of users that have an unknown sentiment to the comment-enabled entry.

10. The method of claim 7 wherein the gauged sentiment of said one user towards said one entry has high intensity, when said one user has posted a larger number of comments than said average.

11. The method of claim 7 wherein the gauged sentiment of said one user towards said one entry has low intensity, when said one user has posted a smaller number of comments than said average.

12. The method of claim 7, further comprising:
   determining irrelevant and low quality comments that have been posted by the plurality of users to the plurality of comment-enabled entries; and
   excluding the irrelevant and low quality comments from the method for gauging the importance of web content.

13. The method of claim 12, wherein the relevancy and quality of a comment is determined using word count analysis and keyword density analysis.

14. The method of claim 7, wherein the comment-enabled entries are obtained from a plurality of distinct web sites.

15. A computerized method for performing a polling process, comprising:
   collecting a plurality of comments that have been posted by a plurality of users to a first comment-enabled entry in a web site, wherein the web site includes a plurality of comment-enabled entries;
   computing a running average number of comments per user per entry within a defined time period;
   analyzing the collected comments to gauge sentiment of each of the users towards the first entry, including comparing the running average to the total number of collected comments that have been posted by a user to the first comment-enabled entry;
   based on the gauged sentiment of each of the users, updating a poll that relates to the first entry; and
   presenting information from said poll to a user.

16. The method of claim 15 wherein the poll indicates what portion of the users have a positive sentiment towards the first entry and what portion have a negative sentiment.

17. The method of claim 15 wherein the gauged sentiment is one of positive and negative.

18. The method of claim 17 wherein the analyzing comprises:
   parsing comments posted by each of the users to a given entry.

19. A computer system for gauging the importance of web content comprising:
   a data collector to be coupled to a network to monitor a web site on the network that has a plurality of comment-enabled entries and collect data about comments posted by a user to one of the entries;
   storage to store the collected comment data;
   a data analyzer to compute a running average number comments per user per entry within a defined time period and analyze the collected comment data to gauge sentiment of the user towards said one of the entries and based on the gauged sentiment decide whether or not to include said one of the entries as part of notable web content, by comparing the running average to a total number of collected comments that have been posted by the user to said one of the comment-enabled entries; and
   a presentation tool to present said notable web content to a user.

20. The system of claim 19 wherein the presentation tool is to present said notable web content on the opening page of the web site.

21. The system of claim 19 wherein the data analyzer is to compute the gauged sentiment of the user as being one of positive and negative.

22. The system of claim 19 wherein the data analyzer is to compute the gauged sentiment of the user as having high intensity,
   the data analyzer to collect data about comments posted by the user to another one of the entries, analyze the collected comments data to gauge sentiment of the user towards said another one of the entries, wherein the gauged sentiment of the user towards said another one of the entries has low intensity.

23. The system of claim 21 wherein the analyzer is to parse the collected comment data to find out how often one or more words of positive sentiment appear, parse the collected comment data to find out how often one or more words of negative sentiment appear.

* * * * *